United States Patent Office 2,923,049
Patented Feb. 2, 1960

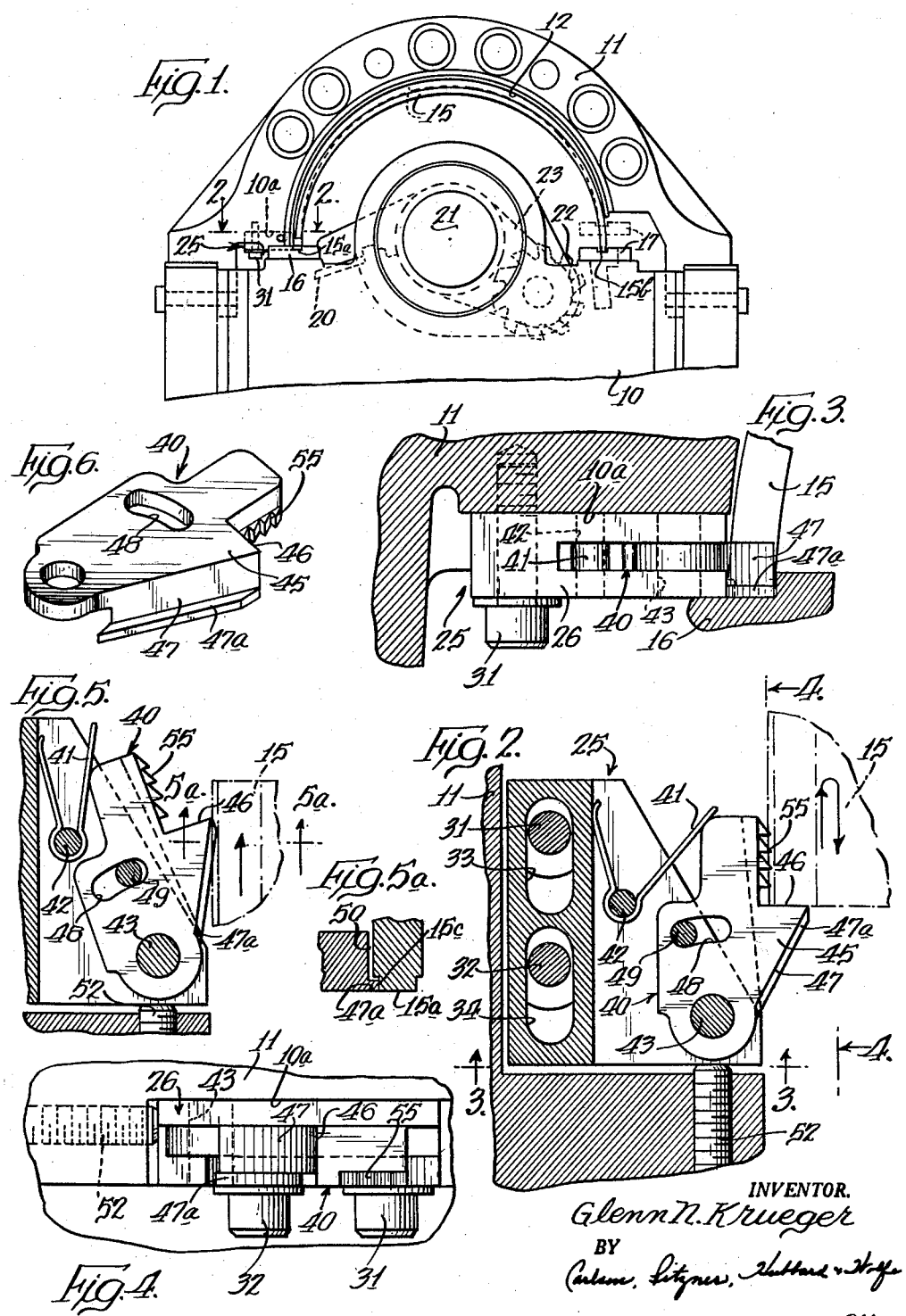

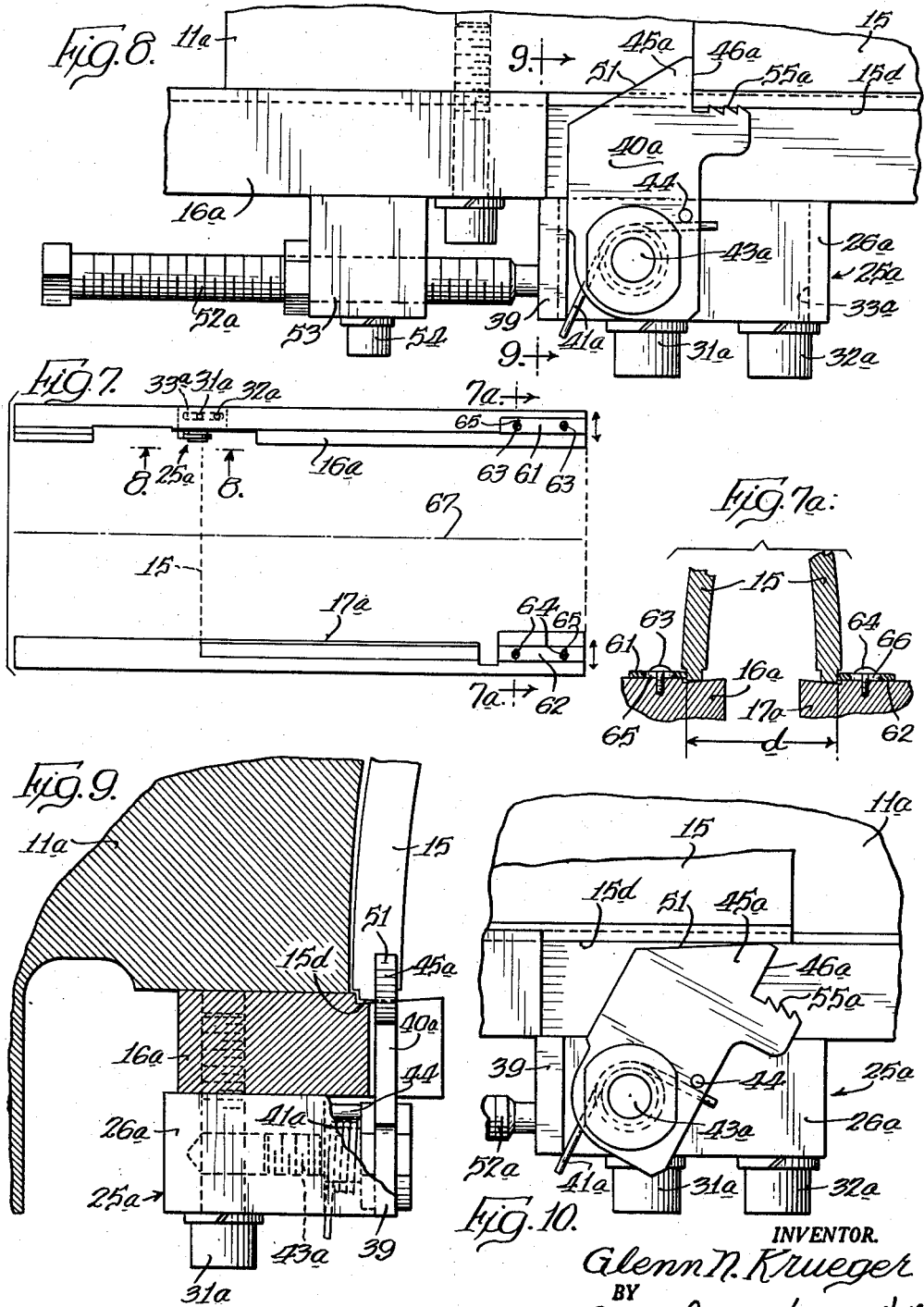

2,923,049

PLATE FINISHING MACHINE

Glenn N. Krueger, North Riverside, Ill., assignor to Miehle-Goss-Dexter, Incorporated, Wilmington, Del., a corporation of Delaware Application July 7, 1955, Serial No. 520,469

6 Claims. (Cl. 29—21)

The present invention relates to plate stops for use in a plate finishing machine.

Conventional plate making machines include a casting box for casting a stereotype plate into cylindrical form against a curved mold or matrix. The cast plates are subsequently passed into a plate finishing machine for the purpose of trimming and bevelling the "tail" or unfinished end of the plate and for shaving the underside. For accurate trimming and bevelling the plate is pushed against an axial stop, following which it is clamped upwardly into a rigid arch. Stops have been proposed for this purpose having an inclined back surface together with a yieldable mounting so that the stop is free to be brushed aside by a plate as the plate is fed endwise into the machine, with the stop popping out into obstructing position just as soon as the plate has gone by. In practice, as soon as an operator hears the click caused by the movement of the stop into its active position he moves the plate backwardly so that it seats on the stop, following which the plate is clamped upwardly into the arch in readiness for the machining operations.

It is the primary object of the present invention to provide improved stop mechanism of the above type for positioning a plate accurately and positively in a plate finishing machine. It is a more specific object to provide a stop mechanism which is mounted in a fixed but adjustable position with respect to the frame of a plate finishing machine so that there is no relative movement between the stop and the plate during the machining operations. It is another object to provide a stop mechanism which has a novel provision for insuring that the stop is not dragged idly across the printing or image area of the plate and which consequently avoids any possibility of marring the plate to produce an imperfect printed impression. It is, moreover, an object of the invention to provide a novel holding means which is retracted during insertion of a plate but which is brought into active position when a plate is seated against the stop and which prevents relative motion between the plate and stop as the plate is clamped upwardly into the arch.

It is an object of the invention in one of its aspects to provide a plate finishing machine which not only insures against axial dislodgement of a plate but which has means for providing accurate alinement thereof during clamp-up.

It is another object of the invention to provide a stop mechanism which is of inexpensive unitary construction, which may be used on new or existing machines with minimum modification and which accommodates plates of different lengths.

Other objects and advantages of the invention will become apparent upon reading the attached detailed description and upon reference to the drawings, in which:

Figure 1 is an end view of a finishing machine as viewed by an incoming plate and showing the shaving arch in profile.

Fig. 2 is a horizontal section of the stop mechanism taken along the line 2—2 in Fig. 1.

Fig. 3 is an enlarged end view of the stop mechanism looking along the line 3—3 in Fig. 2.

Fig. 4 is a view taken at right angles to Fig. 3, viz., looking along the line 4—4 in Fig. 2.

Fig. 5 is a fragmentary view similar to Fig. 2 but showing the rearward yielding movement of the stop which occurs as a plate is inserted into the finishing machine.

Fig. 5a is an enlarged fragmentary section taken along the line 5a—5a in Fig. 5.

Fig. 6 shows in perspective the stop lever used in the present device.

Fig. 7 is a top view of a modified form of locking mechanism as installed and showing a novel means for alining the opposite end of the plate.

Fig. 7a is an enlarged fragmentary section taken along the line 7a—7a in Fig. 7.

Fig. 8 is a side view of the locking mechanism taken along the line 8—8 in Fig. 7.

Fig. 9 is an end view taken along the line 9—9 in Fig. 8.

Fig. 10 shows the deflection of the stop which occurs upon sliding a plate into the arch.

While the invention has been described in connection with certain preferred embodiments, it will be understood that I do not intend to limit the invention to the embodiments shown but intend to cover the various modifications and alternatives included within the spirit and scope of the appended claims.

Referring now to Figure 1 there is shown a portion of of a plate finishing machine including a bed or frame 10 and a shaving arch 11 having a cylindrical reference surface 12 on its underside. Subsequent to casting and while the plate, indicated at 15, is still hot, it is slid endwise from an adjacent casting position into a position under the arch 11. During this movement, the straight edges 15a, 15b of the plate slide on surfaces provided on a guide rail 16, which is fixed in position, and on a vertically movable support or clamping guide rail 17, respectively. After the plate has been located in the desired axial position, as discussed more fully below, the clamping guide rail 17 is moved upwardly, raising the plate into a position in which it is solidly clamped against the reference surface 12 of the arch. The means for applying the clamping force is well known to one skilled in the art. Also well known are the tools generally employed for shaving the underside of the plate and for trimming and bevelling the "tail" or unfinished end thereof which is generally the leading end as the plate is fed into the finishing machine. As to shaving the underside it will suffice to say that a shaving knife 20 is used mounted on an axially extending shaft 21, the latter being rotated slowly and at high torque by a conventional driving arrangement. The "tail" or unfinished end of the plate is cut off by a power-driven circular saw 22 which is mounted on an arm 23 secured to the shaft 21, the saw thus being advanced in unison with the shaving knife.

With the overall operation of the finishing machine in mind, reference will next be made to the remaining figures which show in detail the construction of the present stop mechanism 25. The mechanism is, first of all, located at the entry of the arch immediately adjacent the guide rail 16 on which one straight edge of the plate is supported as it is slid into the machine. The mechanism includes the flattened C-shaped frame member 26 which contains the stop lever and its associated parts and which is securely clamped to a supporting surface 10a (see Figs. 1 and 3) machined on the underside of the arch member 11. Mounting of the frame member 26 against the supporting surface is accomplished by a pair of fastening screws 31, 32 which are screwed into the arch member and which are received in a pair of elongated slots 33, 34 in the frame member. It will be understood that the supporting surface 10a extends axially with tapped holes provided at intervals so that the stop mechanism may be located at any position depending upon the length of the plate to be machined, access being had through a suitable longitudinal opening between the arch and the guide rail.

For the purpose of engaging the trailing end of the plate so as to block it in position for machining while permitting it to yield as a plate is pushed into the machine, a stop lever 40 is provided which is biased inwardly relative to the arch into an extended or obstructing position by means of a biasing spring 41, the latter being supported on a pin 42. The top lever 40 is pivoted about a pivot pin 43. Along one side of the stop member is a triangular projection 45 having a stop surface 46 for engaging the end of the plate and an inclined rear surface 47. The inner and outer limits of the movement of the stop lever 40 are determined by an arcuate slot 48 engaged by a transverse stop pin 49.

In accordance with the present invention a striker in the form of a narrow rib or projection 47a is formed along the lower edge of the inclined surface 47 so that it bears against a narrow depressed area adjacent the straight edge 15a of the plate. This area, indicated at 15c in Fig. 5a, is a marginal area on which there is no type and which is generally recessed below the surface of the plate as shown. As a result when the plate 15 is pushed into the finishing machine, engagement occurs solely between the area 15c on the plate and the rib 47a on the stop lever. Upon the plate moving into the arch in the direction of the arrow in Fig. 5, the stop lever is rotated outwardly, i.e., rearwardly into a recessed position in the frame member 26. The height of the rib 47a on the stop lever is sufficient so that clearance indicated at 50 exists between the stop lever and the printing area of the plate all during the time that the plate is being pushed into position. This clearance insures that the stop lever will not be dragged, relatively, across the surface of the plate to damage the cast characters and to cause an imperfect printed impression. It is found that eliminating the above-mentioned dragging is particularly important where plates are fed into the finishing machine at relatively high temperature and where the plate material may accordingly be rather soft and easily damaged.

In accordance with another aspect of the invention, a serrated clamping surface is provided on the stop lever for engaging the plate incident to the plate's being seated on the stop surface and for preventing the plate from being dislodged from the stop surface during the clamping-up operation. In the present instance, a serrated clamping surface indicated at 55 is formed integrally on the stop lever closely adjacent and at right angles to the stop surface 46. The serrations may be in the form of vertical ridges as illustrated or, if desired, a fine pattern of upraised points may be provided. The clamping action of the serrated surfaces is brought out in Fig. 2 where the left rear corner of the plate 15 is indicated in dot-dash outline. It will be apparent that as the plate is moved against the stop surface in the direction of the arrow, a moment will be applied in a clockwise direction about the pivot pin 43, thereby forcing the tips of the serrations into the relatively soft plate material. This engagement preferably occurs at the recessed marginal edge 15c of the plate which, as noted, is free of type. With the tips of the serrations shallowly engaging the plate, clamping pressure is applied by the clamping rail member 17 (Fig. 1). Progressive clamping tends to rock the plate about the opposite straight edge 15a and tends to cause the serrations to bite more firmly into the plate metal. This action prevents even the slightest dislodgement of the plate from the stop surface and consequently insures trimming and bevelling of the "tail" of the plate to accurate length.

When it becomes necessary to regrind or replace the cut-off saw 22, it may be necessary to readjust the position of the stop mechanism. Such readjustment is facilitated by providing a set screw 52 which is screwed axially into the arch and which bears against the end of the frame member 26. To effect an adjustment, the fastening screws 31, 32 are backed off slightly and the adjusting screw 52 is turned in one direction or the other, keeping the frame of the stop mechanism in constant engagement with the tip of the adjusting screw, following which the fastening screws are retightened. In the event that the plate length is to be changed the stop mechanism may be placed in a new axial position with the screws 31, 32 engaging suitable tapped holes.

In addition to the features and advantages of the device described above, it will be apparent to one skilled in the art that the construction is compact, unitary and inexpensive. The frame of the mechanism may be mounted on any suitable mounting surface on new finishing machines or, where an opening or pocket is provided, on finishing machines already in use.

While the above constitutes a preferred embodiment of the invention having a number of important features and advantages, attention is directed to an alternate embodiment disclosed in Figs. 7–10 and which possesses some of the same features. In order to understand the construction of the alternate form of mechanism, corresponding reference numerals will be used where applicable with the subscript "a." The arch $11_a$ includes longitudinal guide rails $16_a$, $17_a$ providing paths for sliding the plate 15 into working position. Secured to the underside of the guide rail $16_a$ is a stop mechanism $25_a$ having a mounting block $26_a$. The mounting block is secured in position by means of fastening screws $31_a$, $32_a$ which are received in an elongated slot $33_a$.

Pivotally mounted on the mounting block $26_a$ for rocking about a horizontal pin $43_a$ is a stop lever $40_a$. The stop lever $40_a$ is biased inwardly toward the arch $11_a$, i.e., in a counterclockwise direction (Fig. 8) by a spring $41_a$, one end of the spring being engaged by a pin 44 on the lever and the other end of the spring being caught behind a lateral extension 39 on the mounting plate. The extension 39 is also in the path of movement of the lever $40_a$ and determines its upright position.

At the top of the lever $40_a$ is a triangular projection $45_a$ having a stop surface $46_a$ for blocking reverse movement of the plate and an inclined back surface 51. Adjacent the stop surface $46_a$ and at right angles thereto is a serrated surface $55_a$.

In carrying out the present invention the stop lever $40_a$ is so positioned that the inclined surface 51 is engaged by the straight edge $15_a$ of the plate as the plate slides into the arch. This results in the stop lever being rocked outwardly, i.e., clockwise, by camming action into the position shown in Fig. 10. In this position the end of the stop lever wipes along the straight edge of the plate until the plate is fully inserted into the arch. As soon as the plate passes by, the stop lever is free to pop back up into the position illustrated in Fig. 8. Following this, the plate is moved backwardly into seated position against the stop surface $46_a$. Dislodgement of the plate when it is lifted into the arch is inhibited by the serrations digging into the edge of the plate, although after the trimming operation is completed, a direct axial force on the plate will shift it axially out of the arch. As in the embodiment described above, the stop arrangement avoids any direct wiping action of the lever upon the printing area of the plate. One of the advantages of the alternative arrangement is that the weight of the plate acts to engage the serrations on the surface $55_a$.

For the purpose of adjusting the stop precisely with respect to the cut-off saw, an adjustment is provided in the form of a set screw $52_a$ which is screwed into a block 53 held in place by a mounting screw 54, adjustment being effected in the same manner as previously described.

In accordance with one of the aspects of the invention means are provided on the guide rails for laterally engaging the extreme lower edge portions of the plate, thereby insuring that the plate is maintained in a position of precise alinement as it is clamped upwardly into the arch. As shown in Figs. 7 and 7a this is accomplished by a pair of adjustable guide members 61, 62 in the form of flat metal strips secured to the guide rails 16a, 17a. The narrow edges of the strips, as shown, engage the narrow recessed edge portions of the plate which are free of upraised type. The strips are mounted in place by mounting screws 63, 64 which are passed through elongated slots 65, 66 in the strips, the slots permitting limited lateral adjustment of the strips in the direction of the arrows shown in Fig. 7.

It has been found advantageous to mount the strips adjacent the outlet of the arch as shown in Fig. 7 and to limit the length to a fraction of the length of the plate itself. It will be apparent, however, that the alinement function is not directly dependent upon the lengths of the strips and the strips may, if desired, be made longer than illustrated in the drawing.

When initially adjusting the strips they are arranged symmetrically with respect to the center line 67 of the machine and are spaced apart a distance $d$ (Fig. 7a) which is the diametrical spacing between the extreme outwardly facing edges of the plate. It will be apparent that the guides 61, 62, by preventing lateral shifting of the plate, cooperate with stop surface 46a and the serrated surfaces (see 55a in Fig. 8) which prevent endwise movement of the plate so that the plate is locked against displacement during clamp-up, insuring that the plate is clamped in a precise location in the arch for machining purposes.

While this guiding arrangement is of arresting simplicity it has been found, when used in conjunction with the axial stop mechanism, to produce accuracy and consistency from plate to plate which is far beyond that normally achieved in plate finishing machines with complete avoidance of unwanted skewing. Thus it is found that the plates machined in the present device are held to closer tolerances, are more square and accurate in length than has been possible with previous machines. Therefore the plates may be registered on a press more easily and quickly than heretofore and the time consuming skewing adjustment is cut to a minimum. Since the portion of the plate which is engaged by the guide members 61, 62, as in the case of the stop members, does not include any upraised type, there is no risk of mutilating the plate when the guides come in contact with the relatively soft plate metal.

While the above construction describes the use of a single stop mechanism, it will be understood that the invention is not limited thereto but would include a second mechanism for engaging the opposite edge of the plate, the construction and mounting of which is simply the mirror image of the mechanism shown.

I claim as my invention:

1. In a plate finishing machine the combination comprising a frame having an arch, a longitudinal support for supporting the straight edges of a printing plate for sliding movement of the plate into a position under said arch, a stop mechanism mounted to be stationary along one of the straight edges of the arch and having a stop member inwardly biased toward blocking position together with means disposed in the path of a plate for causing the latter to cam the member outwardly incident to sliding the plate into position in said arch, said last-named means including a striker member positioned and arranged to engage a narrow ribbon-like area along the said straight edge of the plate thereby to prevent relative dragging movement of the stop member across the printing surface of the plate during its sliding movement.

2. In a plate finishing machine the combination comprising a frame having an arch, a longitudinal support for supporting the straight edges of a printing plate for sliding movement of the plate into a position under said arch, a stop mechanism mounted to be stationary along one of the straight edges of the arch and having a stop member inwardly biased toward blocking position together with means disposed in the path of a plate for causing the plate to cam said member outwardly incident to sliding the plate into position in said arch, said stop mechanism having a serrated clamping member coupled to said stop member and so arranged that the serrations thereof engage the plate as the plate is retracted into seated engagement with said stop to insure that the plate is not dislodged axially during clamp-up.

3. For use in a plate finishing machine having a shaving arch and a longitudinal support for suporting the straight edges of a printing plate for sliding movement of the plate into a position under said arch, a stop mechanism comprising a frame adapted to be secured stationary on the plate finishing machine along the path of movement of one of the straight edges of the plate, a stop lever pivoted in said frame and having a stop surface for abutting the end of the plate, means for biasing the stop lever toward its blocking position, said stop lever having a striker positioned to engage a narrow ribbon-like area along the extreme edge of the plate so that the stop lever is swung away from the printing surface of the plate incident to sliding a plate into said arch, said stop lever having a serrated face portion at right angles to said stop surface so that the plate is engaged by the serrations incident to seating the end of the plate on the stop surface.

4. In a plate finishing machine the combination comprising a frame having a finishing station, longitudinal support means for supporting the straight edges of a printing plate for sliding of the same endwise into the finishing station, a stop mechanism mounted stationary on said frame adjacent one of said edges, said stop mechanism having a stop member biased into a plate-engaging position and having an inclined rear surface arranged in the path of movement of an incoming plate so that the stop member is cammed away from the plate against the force of bias, said inclined rear surface having a narrow lateral projection for engaging the plate along a narrow ribbon-like path immediately adjacent the said straight edge of the plate thereby to provide clearance between the stop member and the printing area of the plate 5. In a plate finishing machine the combination comprising a frame having a finishing station together with means for trimming the "tail" of the plate, support means for suporting the straight edges of a printing plate for sliding of the same endwise into the finishing station, a stop mechanism including a mounting plate fixed rigidly on said frame, said stop mechanism having a retractable stop member including a stop surface facing at right angles to the path of movement of the plate and a cam surface facing in the path of movement of the plate, means for biasing the stop member inwardly toward the center of the finishing station, said cam surface being so positioned and arranged as to engage the plate along a narrow ribbon-like path immediately adjacent the straight edge of the plate and spaced from the printing area thereof, and means for adjusting the axial position of the mounting plate on the frame.

6. In a plate finishing machine, the combination comprising a frame including an arch having an inlet and an outlet, a pair of guide rails located along the base of the arch for supporting the straight edges of a stereotype plate and for guiding the same into position in said arch, a pair of laterally adjustable guides in the form of flat strips associated with the respective guide rails and located at the outlet of the arch, said guide members being arranged to engage the extreme lateral edge portions of the plate, a plate stop mechanism fixed rigidly to the machine frame adjacent at least one of said rails at the inlet of the arch, said stop mechanism including a stop member having an axially facing stop surface for axially positioning the plate, and means providing a serrated surface for engaging the edge portion of the plate incident to seating the plate on the stop surface thereby to inhibit endwise movement of the plate away from said stop surface.

References Cited in the file of this patent

UNITED STATES PATENTS

| | | |
|---|---|---|
| 159,946 | Mayall et al. | Feb. 16, 1875 |
| 1,009,271 | Wood | Nov. 21, 1911 |
| 1,652,717 | Hopkins | Dec. 13, 1927 |
| 2,247,997 | Griner et al. | July 1, 1941 |
| 2,293,091 | Wood et al. | Aug. 18, 1942 |